Jan. 15, 1946. C. J. GREEN 2,393,040
GRINDING MACHINE-TABLE INDEXING MECHANISM
Filed Feb. 17, 1944 2 Sheets-Sheet 1

Inventor
CLARENCE J. GREEN
By Harold W. Eaton
Attorney

Jan. 15, 1946. C. J. GREEN 2,393,040
GRINDING MACHINE-TABLE INDEXING MECHANISM
Filed Feb. 17, 1944 2 Sheets-Sheet 2
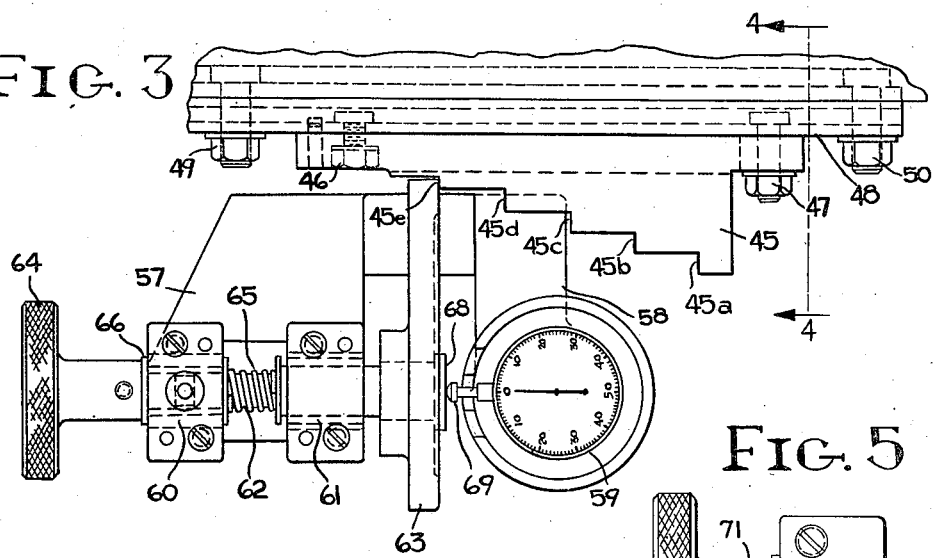
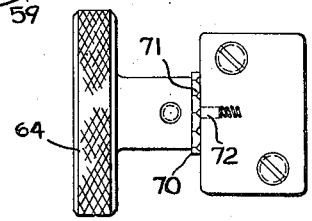
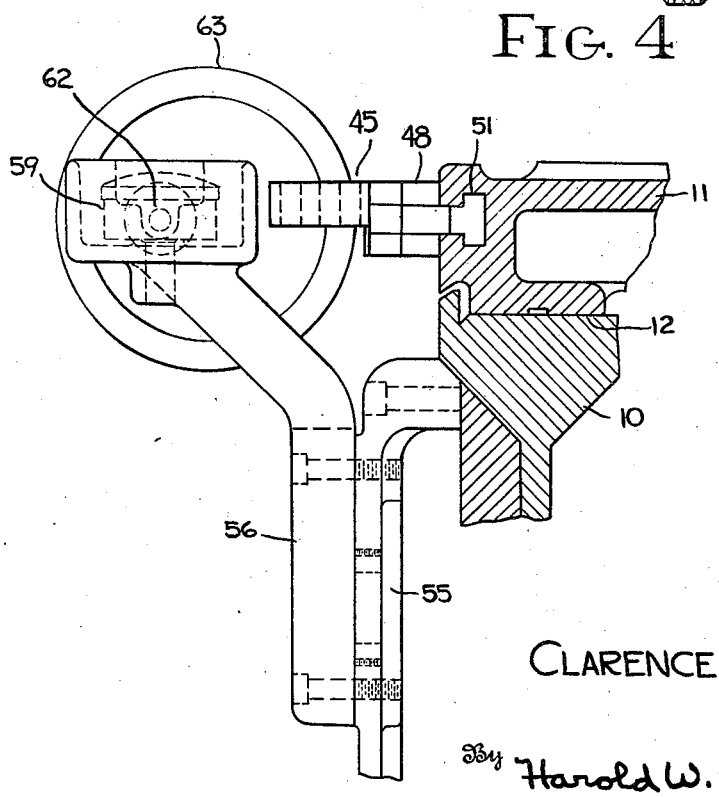
Inventor
CLARENCE J. GREEN
By Harold W. Eaton
Attorney Patented Jan. 15, 1946

2,393,040

UNITED STATES PATENT OFFICE 2,393,040

GRINDING MACHINE—TABLE INDEXING MECHANISM

Clarence J. Green, Worcester, Mass., assignor to Norton Company, Worcester, Mass., a corporation of Massachusetts Application February 17, 1944, Serial No. 522,744

5 Claims. (Cl. 51—72)

The invention relates to grinding machines, and more particularly to a work table indexing and positioning mechanism for shoulder grinding.

One object of the invention is to provide a simple and thoroughly practical table indexing and positioning mechanism. Another object of the invention is to provide an indexing attachment in which a dial indicator serves to facilitate relatively and accurately positioning the grinding wheel for grinding predetermined spaced shoulders on a work piece. Another object of the invention is to provide a table positioning and indexing mechanism for successively positioning the work piece relative to the grinding wheel for grinding a plurality of predetermined closely spaced shoulders on a work piece.

A further object of the invention is to provide a rotatably indexed cam or eccentric and a stepped dog bar to facilitate precisely positioning the table and work piece relative to the grinding wheel for successively grinding a plurality of spaced shoulders on a work piece. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is a front elevation of a cylindrical grinding machine embodying this invention;

Fig. 3 is a fragmentary plan view, on an enlarged scale, of the improved table indexing and positioning mechanism;

Fig. 4 is a fragmentary cross sectional view, taken approximately on the line 4—4 of Fig. 3, showing the table indexing and positioning mechanism in end elevation; and Fig. 5 is a fragmentary plan view, on an enlarged scale, of a modified form of indexing knob for a cam of eccentric.

Figure 1:
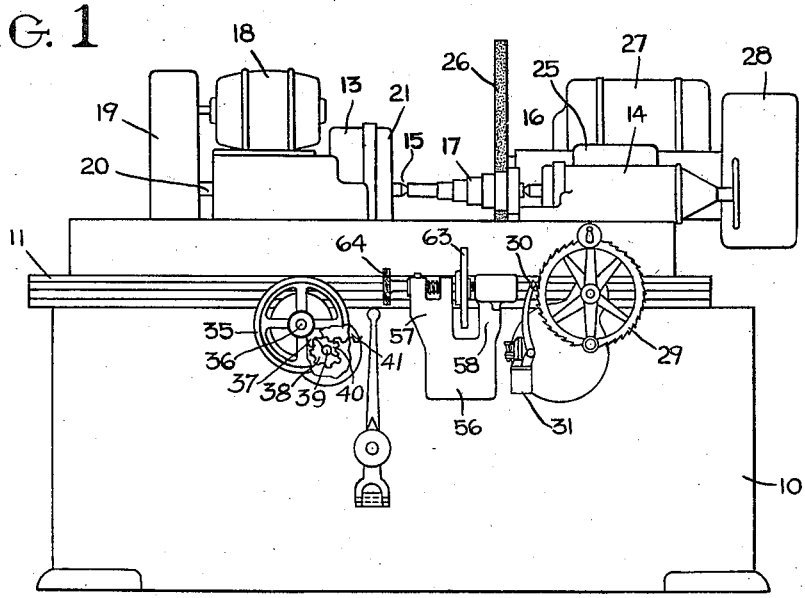

A cylindrical grinding machine has been illustrated in the drawings comprising a base 10 which supports a longitudinally reciprocable work supporting table 11 on a flat way 12 and a V-way (not shown) formed on the upper surface of the base 10. The work supporting table 11 serves as a support for a rotatable work supporting mechanism comprising a headstock 13 and a footstock 14. The headstock 13 and footstock 14 are provided with work supporting centers 15 and 16, respectively, which serve as supports for opposite ends of a cylindrical type work piece 17.

The headstock 13 is preferably a motor driven headstock comprising an electric motor 18 which is connected by driving belts (not shown) contained within a belt guard 19. The belt drive drivingly connects the motor 18 with a rotatable spindle 20 which is in turn operatively connected to rotate a face plate 21 which may be connected by the usual driving pin (not shown) with a work dog (not shown) positively to drive and rotate the work piece 17 during a grinding operation.

The base 10 also serves as a support for a transversely movable wheel slide 25 which is arranged to slide transversely on the usual V-way and flat way (not shown) on the base 10. The wheel slide 25 serves as a support for a grinding wheel 26. The grinding wheel 26 is mounted on one end of a rotatable wheel spindle (not shown) which is driven by means of an electric motor 27 mounted on the upper surface of the wheel slide 25. A belt drive contained within a belt guard 28 drivingly connects the motor 27 with a wheel spindle (not shown).

A grinding wheel feeding mechanism of the old and well known type, such as for example that shown in the expired U. S. patent to C. H. Norton No. 762,838 dated June 14, 1904, is provided for feeding the grinding wheel 26 together with its supporting wheel slide 25 transversely either toward or from the work piece 17. A manually operable feed wheel 29 is provided which is connected by a reduction gearing (not shown) to rotate a cross feed screw (not shown) so as to transmit a transverse movement of the slide 25 when the hand wheel 29 is rotated. A feed pawl 30 is provided for automatically actuating the feed wheel 29 when desired. The pawl 31 is preferably actuated by a hydraulically operated mechanism 31 in a manner well known in the grinding machine art.

A manually operable table traverse mechanism is provided for traversing the work supporting table 11 longitudinally relative to the base 10 to position the work piece 17 in predetermined positions relative to the operative face of the grinding wheel 26. This mechanism may comprise a manually operable traverse wheel 35 which is supported on the outer end of a rotatable shaft 36. The shaft 36 supports a gear 37 which meshes with a gear 38 mounted on a rotatable shaft 39. The shaft 39 also supports a gear 40 which in turn meshes with a rack bar 41 depending from and extending longitudinally of the under side of the work table 11. It will be readily apparent from the foregoing disclosure that a rotary motion of the traverse wheel 35 will be imparted through the rack and gear mechanism above described to traverse the table 11 longitudinally. The direction of movement of the table 11 is determined by the direction of rotation of the manually operable traverse wheel 35.

A table positioning and indexing mechanism may comprise a stepped stop dog bar 45 which is provided with a plurality of steps 45a, 45b, 45c, 45d, and 45e. The table stop dog bar is held in a fixed position by screws 46 and 47 on a plate 48. The plate 48 is adjustably supported by clamping bolts 49 and 50 to a T-slot 51 formed in the front edge of the table 11. In Fig 1, the work table is in its right-hand end position with the grinding wheel positioned to grind the right-hand end step on the work piece 17, whereas Figs. 3 and 4 show the table positioning mechanism in position to grind the shoulder at the left-hand end of the work piece 17.

Figure 2:
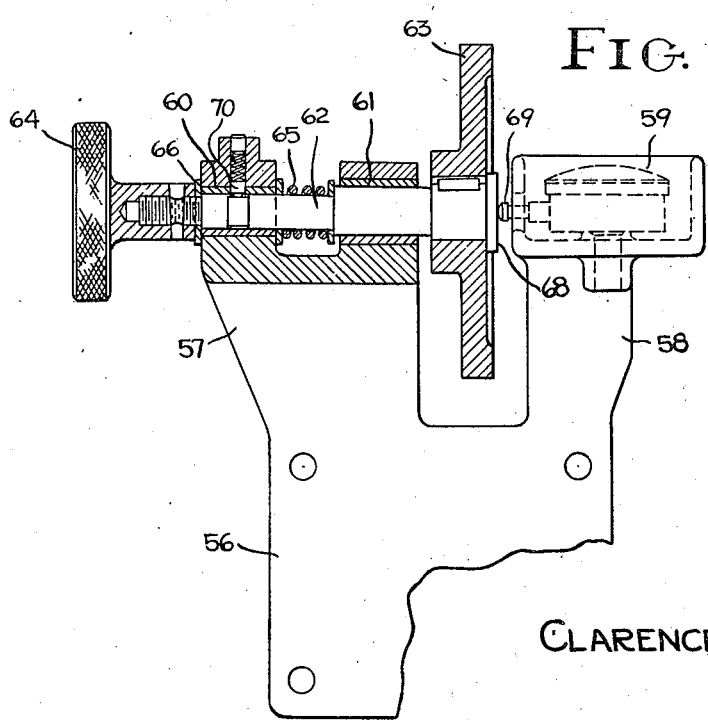
Fig. 2 is a fragmentary vertical section, on an enlarged scale, of the improved table indexing and positioning mechanism.

In order to provide a suitable stop mechanism for stopping and positioning the table 11 in a plurality of closely spaced positions, a rotary stop mechanism is provided which preferably comprises a rotatable stop or eccentric 63. A bracket 55 is fixedly mounted on the front of the machine base 10. The bracket 55 supports a second bracket 56 which is provided with two upwardly extending arms 57 and 58. A dial indicator 59 is supported at the upper end of the arm 58. The arm 57 serves as a support for a pair of spaced bearings 60 and 61 which serve as a rotatable support for a shaft 62. The stop or eccentric 63 is fixedly mounted on the right-hand end of the shaft 62 (Figs. 2 and 3). An actuating knob 64 is mounted at the left-hand end of the shaft 62 and is arranged to rotate the shaft 62 within its bearings 60 and 61 to position the stop or eccentric 63 in a plurality of predetermined positions in alignment with the successive steps on the stepped dog bar 45. A compression spring 66 is provided normally to urge the shaft 62 in a direction toward the right (Figs. 2 and 3) so that the right-hand end of the knob 64 is maintained in engagement with a thrust washer or collar 66, thus holding the stop or eccentric plate 63 in a predetermined relationship relative to the dial gauge 59.

The right-hand end of the shaft 62 is provided with a bearing surface 68 which is arranged to be engaged by the actuating plunger 69 of the dial indicator 59.

If desired, an index arrangement may be provided for rotarily indexing the stop or eccentric plate 63 to position it in predetermined positions with respect to successive steps on the dog plate 45. As shown in the modification in Fig. 5, the actuating knob 64 may be provided with an integral flange 70 at its right-hand end which is provided with a plurality of spaced notches 71 formed in its right-hand end face. The notches 71 are spaced to provide a sufficient rotation of the stop or eccentric plate 63 to position it relative to the steps on said dog bar 45. A spring-pressed detent 72 is supported in the upper portion of the arm 57 and is arranged to engage one of the notches 71 formed in the flange 70. It will be readily apparent from the foregoing disclosure that the knob 64 may be readily turned to rotate the stop or eccentric plate 63, and the notches 71 and detent 62 will serve successively to position the stop or eccentric 63 in predetermined positions with respect to the steps formed on the dog bar 45.

In the operation of this improved table indexing and positioning mechanism, a dog bar 45, having a plurality of steps which are spaced to correspond with shouldered portions on a work piece 17 to be ground, is mounted on the front edge of the table 11. The dog bar 45 may then be adjustably positioned along the front of the table 11 to position the dog bar 45 for grinding the first step on the work piece. After the first shoulder on the work piece 17 has been ground to the desired and predetermined extent, the knob 64 may then be rotated to position the periphery of the stop or eccentric 63 relative to the next step on the dog bar 45. The work supporting table 11 may then be traversed longitudinally until the next step on the dog bar 45 engages the side face of the stop or eccentric 63 to position the work piece 17 for grinding the next shoulder thereon. The compression spring 65 is provided to cushion the movement of the dog bar steps into engagement with the stop plate 63. After the stop plate 63 has been moved into engagement with the step on the dog bar, the table traverse wheel 35 is rotated in one direction or the other until the dial indicator 59 indicates a zero reading, in which position the work piece 17 is precisely positioned for grinding the next shoulder. It will be readily apparent from the foregoing disclosure that by a partial rotation of the knob 64 and the eccentric or stop plate 63, the table 11 may be indexed or traversed longitudinally to grind a plurality of relatively closely spaced shoulders on a work piece 17.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base and a reciprocable table mounted thereon, an adjustably mounted stepped dog on one of said parts having a plurality of spaced stop surfaces which correspond to spaced portions on a work piece to be ground, a rotarily adjustable stop on the other of said parts including a dial indicator associated with said stop, and means rotarily to adjust the position of said stop successively into alignment with one of said spaced stop surfaces on said dog precisely to position the work piece for a grinding operation.

2. In a grinding machine having a base and a table reciprocably mounted thereon, an adjustably mounted stepped dog on one of said parts having a plurality of spaced stop surfaces which correspond to spaced portions on a work piece to be ground, a rotatable stop on the other of said parts having its peripheral portion lying in the path of one of said spaced stop surfaces, and means to index said stop so that its peripheral portion may be successively aligned with successive spaced stop surfaces on said dog to facilitate precisely positioning a work piece for grinding a plurality of portions thereon.

3. In a grinding machine having a base and a table reciprocably mounted thereon, an adjustably mounted stepped dog on said table having a plurality of spaced stop surfaces which correspond to spaced portions on a work piece to be ground, a rotatable stop on said base having a peripheral portion lying in the path of one of said stepped stop surfaces, and means to index said stop so that its peripheral portion may be successively aligned with successive spaced stop surfaces on said dog to facilitate precisely positioning the work piece for grinding a plurality of portions thereon.

4. In a grinding machine having a base and a table reciprocably mounted thereon, an adjustably mounted stepped dog on said table having a plurality of spaced stop surfaces which correspond to spaced portions on a work piece to be ground, a rotatable stop on said base having its peripheral portion lying in the path of one of said spaced stop surfaces, and means precisely and rotarily to index said stop into predetermined positions so that its peripheral portion may be successively aligned with predetermined spaced stop surfaces on said dog to facilitate precisely grinding a plurality of spaced portions on a work piece.

5. In a grinding machine having a base and table reciprocably mounted thereon, an adjustably mounted stepped dog on one of said parts having a plurality of spaced stop surfaces which correspond to spaced portions on a work piece to be ground, a rotatable stop on the other of said parts having its rim portion lying in the path of one of said spaced stop surfaces, said stop being arranged for a limited yieldable axial movement in one direction, a dial indicator associated therewith to indicate the position of said stop, and means to index said stop so that its rim portion may be successively aligned with successive spaced stop surfaces on said dog to facilitate precisely positioning a work piece for grinding a plurality of portions thereon.

CLARENCE J. GREEN.